United States Patent [19]

Yamano et al.

[11] Patent Number: 4,534,215

[45] Date of Patent: Aug. 13, 1985

[54] TAPE TENSION MEASURING DEVICE

[75] Inventors: Yuzo Yamano, Kanagawa; Hikaru Oozeki, Tokyo, both of Japan

[73] Assignee: Sony Corporation, Tokyo, Japan

[21] Appl. No.: 900,609

[22] Filed: Apr. 27, 1978

[30] Foreign Application Priority Data

Apr. 28, 1977 [JP] Japan .............................. 52-55266[U]
Apr. 28, 1977 [JP] Japan .............................. 52-55267[U]

[51] Int. Cl.² ............................ G01L 5/06; G01L 3/18
[52] U.S. Cl. .................................................. 73/862.44
[58] Field of Search ............ 73/134, 143, 1 C, 136 R, 73/136 A, 136 B, 136 C, 133 R

[56] References Cited

U.S. PATENT DOCUMENTS 3,771,358 11/1973 Yamano ................................. 73/134
3,942,367 3/1976 Thompson ............................. 73/134

FOREIGN PATENT DOCUMENTS

1919371 4/1969 Fed. Rep. of Germany ........ 73/143

*Primary Examiner*—Charles A. Ruehl
*Attorney, Agent, or Firm*—Lewis H. Eslinger; Alvin Sinderbrand

[57] ABSTRACT

A tape-tension measuring device is made to be interchangeable with a tape cassette in a cassette-type magnetic recording and/or reproducing apparatus for accurately indicating the tension produced in the recording and reproducing modes of such apparatus. The tape-tension measuring device has a casing equivalent to the housing of the tape cassette to be interchanged therewith, and first and second reel assemblies corresponding to the take-up and supply reels of a tape cassette are provided within the casing to receive the take-up and supply reel shafts of the recording and/or reproducing apparatus. The second reel assembly has inner and outer ring portions which are relatively rotatable against the resistance of a spring in response to the tension in a test tape which extends between and is wound on the reel assemblies. The test tape is guided between the reel assemblies so that the recording and/or reproducing head and the erasing head of the apparatus remain free of the test tape to avoid influencing the tape tension produced by the cooperative action of the capstan and pinch roller of the apparatus. A tape cleaning member ensures that a clean section of the test tape is engaged by the capstan and pinch roller.

22 Claims, 10 Drawing Figures

TAPE TENSION MEASURING DEVICE

BACKGROUND OF THE INVENTION

1. Field of the Invention

This invention relates generally to the measurement of tape-tension in a tape recording and/or reproducing apparatus, and more particularly is directed to an improved tape-tension measuring device which is interchangeable with a tape cassette for measuring the tape tension in a cassette-type magnetic tape recording and/or reproducing apparatus, such as, a cassette-type tape recorder for audio signals or a cassette-type VTR (Video Tape Recorder).

2. Description of the Prior Art

In a cassette-type magnetic tape recording and/or reproducing apparatus, a magnetic tape is drawn or unwound from a supply reel and directed by guide rollers or pins so as to move in a tape transport path prior to being rewound on a take-up reel. In such tape transport path between the guide rollers or pins, the tape is successively engaged by at least one magnetic head for recording or reproducing signals on the tape and, a rotated capstan and a pinch roller pressed toward the capstan with the tape therebetween so as to move or transport the tape. In the described tape transport path, the tension produced in the tape at the run thereof extending from the supply reel to the nip between the capstan and pinch roller is an important factor in achieving the stable or uniform transport of the tape. Accordingly, in designing or assembing the magnetic tape recording and/or reproducing apparatus, the tension in the described tape run is measured and adjusted to a predetermined value.

It will be apparent that the described tape tension is determined, at least in part, by the force with which the pinch roller is pressed against the capstan for engaging the magnetic tape therebetween. Therefore, in the conventional method of measuring the tape tension, a spring balance is employed for determining the force with which the pinch roller is pressed against the capstan, and the tape tension is estimated from the force measured by the spring balance. In other words, the tape tension is indirectly measured so that the described procedure is rather troublesome and also error prone. Moreover, the relationship between the tape tension and the force with which the pinch roller is pressed against the capstan tends to vary with aging of the pinch roller or contamination of its surface, for example, with oily substances. Where such relationship varies substantially, the actual tape tension cannot be estimated with any degree of accuracy even though the force urging the pinch roller against the capstan is accurately measured.

It has been known, for example, as specifically disclosed in U.S. Pat. No. 3,771,358, having a common assignee herewith, to provide a torque measuring device adapted to take the place of a tape cassette in a cassette-type magnetic tape recording and/or reproducing apparatus for directly indicating the torque applied to the take-up reel of a tape cassette during a recording or reproducing operation and/or the back tension generated in the tape intermediate its engagement by the capstan and pinch roller and the supply reel. Such torque measuring device generally comprises a casing substantially equivalent to the cassette housing to be interchanged therewith and having openings at locations along one side of the casing for receiving the capstan and pinch roller and the usual recording and reproducing head and erasing head of the recording and/or reproducing apparatus. The casing contains first and second reel assemblies including respective inner ring portions to be rotatably coupled with the take-up and supply reel shafts of the recording and/or reproducing apparatus, outer ring portions rotatable relative to the respective inner ring portions against the resistance of respective spiral springs and a test tape having portions wound on the outer ring portions of the first and second reel assemblies and an intermediate tape run therebetween which is guided along the previously-mentioned side of the casing. Therefore, when measuring torque or tape tension in the recording or reproducing mode of the apparatus, the intermediate tape run is engaged between the capstan and pinch roller and is driven thereby, while the take-up reel shaft tends to take-up or wind the tape on the outer ring portion of the first reel assembly and the supply reel shaft exerts a drag on the unwinding of the tape from outer ring portion of the second reel assembly. The torque applied to the outer ring portion of the first reel assembly from the take-up reel shaft is indicated as a function of the angle of relative turning of the ring portions of the first reel assembly, while the back tension in the tape run between the nip of the capstan and pinch roller and the second reel assembly, and which results from the drag exerted by the supply reel shaft, is indicated as a function of the angle of relative turning of the inner and outer ring portions of the second reel assembly.

A number of problems are associated with the operation of the above-described torque measuring device. First of all, if the recording or reproducing mode of the apparatus is maintained for a substantial period of time to permit reading of the torque and back tension indications, then the test tape must be of substantial length so as to permit the winding and unwinding of the test tape on the first and second reel assemblies, respectively, during such period. The foregoing problem can be avoided, for example, as disclosed in Japanese Utility Model Unexamined Publication No. 4305/76, filed by the assignee of the present application, and which was published Jan. 13, 1976, by providing a slippable friction clutch in place of the spiral spring connected between the inner and outer ring portions of the first reel assembly associated with the take-up reel shaft. Such slippable friction clutch may be constituted by an elongated spring of square or other polygonal shape so as to have a plurality of sides and corners therebetween with the sides and corners of the spring being respectively pressed against the inner and outer ring portions of the first reel assembly. Further, the inner ring portion of the second reel assembly to be associated with the supply reel shaft is fixed relative to the casing. With such arrangement disclosed in the identified Utility Model Application, the outer ring portion of the second reel assembly turns relative to the fixed respective inner ring portion until the force exerted by the spiral spring resisting such relative turning is equal to the drive force that can be exerted on the test tape by engagement of the capstan and pinch roller therewith. When the spring force resisting further relative turning becomes equal to the drive force, the capstan and pinch roller slip relative to the rest tape and, simultaneously, slippage occurs in the slippable friction clutch between the inner and outer ring portions of the first ring assembly. Thus, unwinding and winding of the test tape occurs only to the extent necessary for the relative angular movement of the inner and outer ring portions of the second reel assembly by which the tape tension is indicated. Accordingly, a relatively short test tape can be employed with such test tape being automatically returned to its initial or starting position each time the tape-tension measuring device is removed from the recording and/or reproducing apparatus.

However, the above-described device from the identified Utility Model Application is still burdened by certain problems that are also inherent in the arrangement disclosed in U.S. Pat. No. 3,771,358. More particularly, in both cases, the test tape is engaged by at least the magnetic recording and reproducing head in addition to the capstan and pinch roller when measuring the tape tension in the recording and reproducing mode of operation. Such engagement with the recording and reproducing head adversely influences the indication of tape tension resulting from the driving of the tape by the capstan and pinch roller. Furthermore, the measurement of tape tension assumes a uniform or standard coefficient of friction at the engagement of the capstan and pinch roller with the test tape. However, through repeated use of the tape-tension measuring device, oily or other contaminating substances may accumulate on the test tape and thereby adversely influence the accuracy of the tape-tension measurements by varying the coefficient of friction at the engagement of the capstan and pinch roller with the test tape.

OBJECTS AND SUMMARY OF THE INVENTION

Accordingly, it is an object of this invention to provide a tape-tension measuring device avoiding the above-described problems associated with the prior art devices for measuring or indicating tape tension in a cassette-type magnetic recording and/or reproducing apparatus.

More particularly, it is an object of this invention to provide a tape-tension measuring device interchangeable with a tape cassette in a cassette-type magnetic tape recording and/or reproducing apparatus, and which is capable of accurately and reliably indicating tape tension in such apparatus when the latter is in either its recording or reproducing mode of operation.

Another object is to provide a tape-tension measuring device, as aforesaid, which comprises a casing substantially equivalent to the cassette housing to be interchanged therewith, first and second reel assemblies in the casing corresponding to the take-up and supply reels of a tape cassette and a test tape wound on the reel assemblies and having a tape run extending therebetween for engagement by the capstan and pinch roller of a recording and/or reproducing apparatus, and in which accuracy of the tape-tension measurement is maintained by avoiding contact of the test tape with the head or heads of the apparatus when measuring tape-tension.

A further object is to provide a tape-tension measuring device, as aforesaid, in which each operation of the device for measuring tape-tension in a recording and/or reproducing apparatus is accompanied by cleaning of the test tape in the tape-tension measuring device so as to ensure a uniform coefficient of friction at the engagement of such test tape by the capstan and pinch roller of the tested apparatus.

In accordance with an aspect of this invention, in a tape-tension measuring device interchangeable with a tape cassette of the type in which the capstan and pinch roller and additional operating members, such as the head or heads, of the magnetic tape recording and/or reproducing apparatus are adapted to extend through respective openings of the cassette housing for engagement with a tape in the latter at spaced apart locations along one side of the cassette housing during recording and reproducing operations; the casing of the tape-tension measuring device is substantially equivalent to the cassette housing and has openings at locations along one side in correspondence to the mentioned openings of the cassette housing, first and second reel assemblies are provided in the casing with a test tape having portions thereof wound on the reel assemblies and an intermediate tape run therebetween, and guide means guide the intermediate tape run in a path which extends along only a portion of said one side of the casing at which the openings for the capstan and pinch roller are located, so that the head or heads of the recording and/or reproducing apparatus remain free of the test tape to avoid influencing the tension therein.

In accordance with another feature of this invention, the tape-tension measuring device is further provided with a tape cleaning member engaging the test tape in the path thereof between the second reel assembly and the openings for the capstan and pinch roller so as to ensure that a clean section of the test tape is engaged by the capstan and pinch roller upon each operation of the device for measuring tape tension.

The above, and other features and advantages of this invention, will be apparent in the following detailed description of illustrative embodiments thereof which is to be read in connection with the accompanying drawings.

DESCRIPTION OF THE PREFERRED EMBODIMENTS

Figure 3:
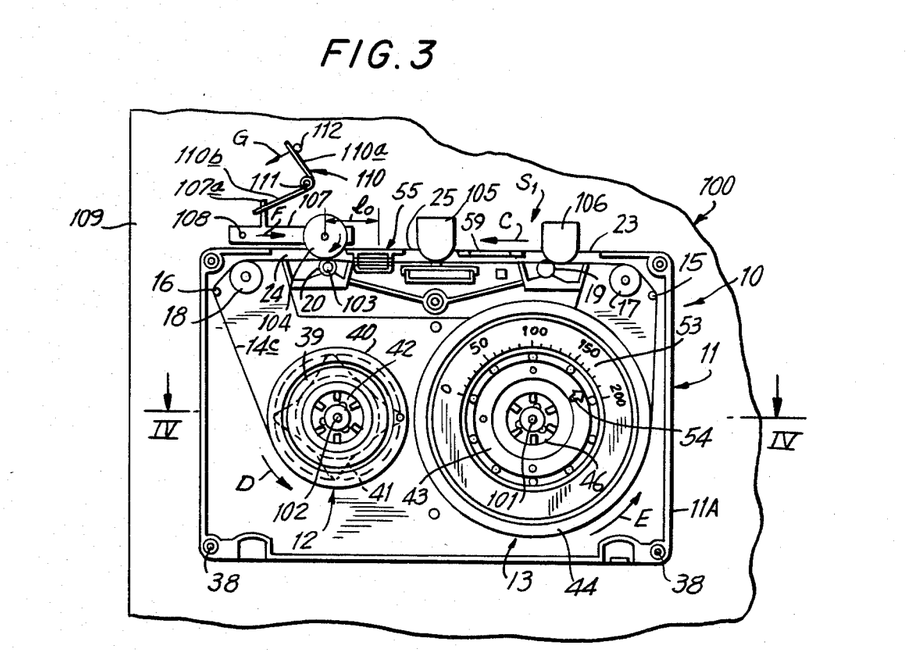
FIG. 3 is a top plan view of the tape-tension measuring device of FIG. 1 with the top wall of its casing removed, and with the device being shown associated with a cassette-type magnetic recording and/or reproducing apparatus for measuring the tape tension generated therein.

Referring to the drawings in detail, and initially to FIG. 3 thereof, it will be seen that a tape-tension measuring device 10 according to this invention is intended to be interchangeable with a conventional tape cassette, for example, of the so-called Philips-type, in a cassette-type magnetic recording and/or reproducing apparatus 100. Such apparatus 100 is shown to have the usual selectively rotated supply and take-up reel shafts 101 and 102 adapted to extend through respective apertures of a cassette housing (not shown) for engagement with tape supply and take-up reels therein. The apparatus 100 is further shown to include a tape drive capstan 103, a pinch roller 104 and additional operating members, such as, a magnetic recording and reproducing head 105 and an erasing head 106, adapted to extend through respective openings of the cassette housing for engagement with a tape in the latter at spaced apart locations along one side of the cassette housing during recording and reproducing operation of apparatus 100.

Figure 1:
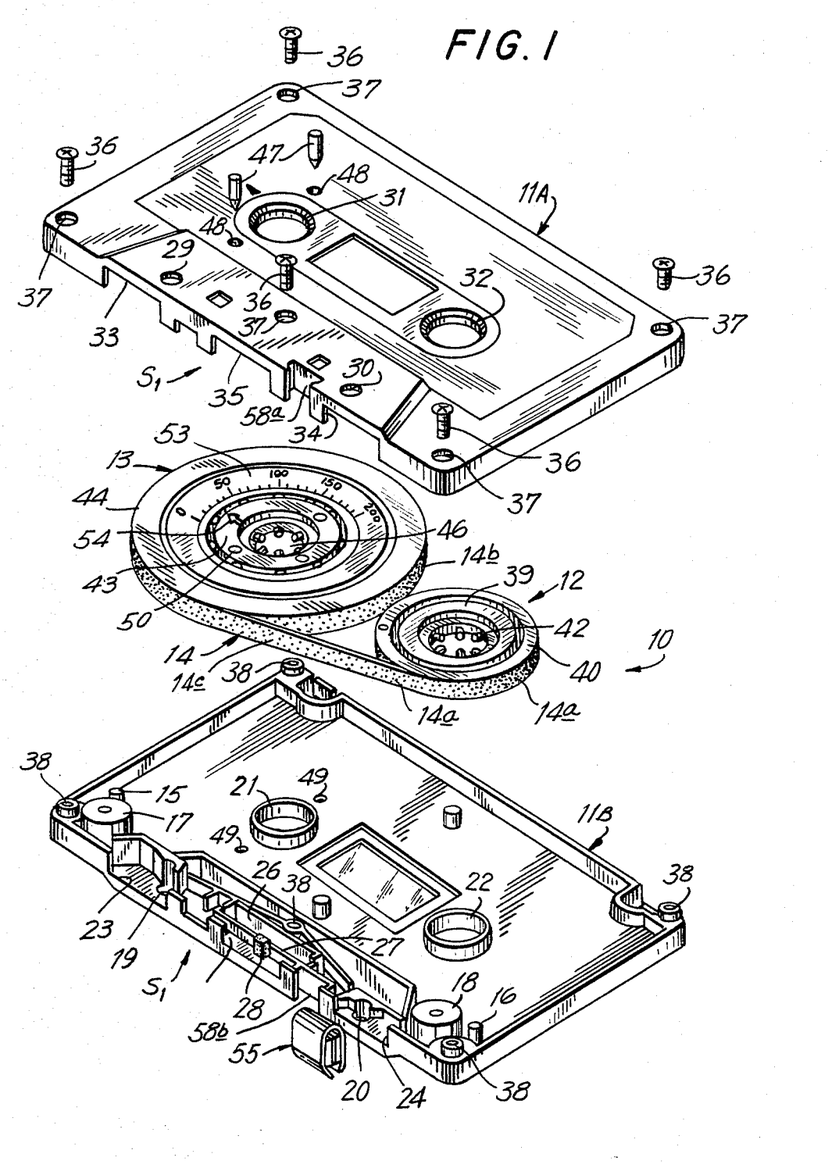
FIG. 1 is an exploded perspective view of a tape-tension measuring device according to one embodiment of this invention.
Figure 4:
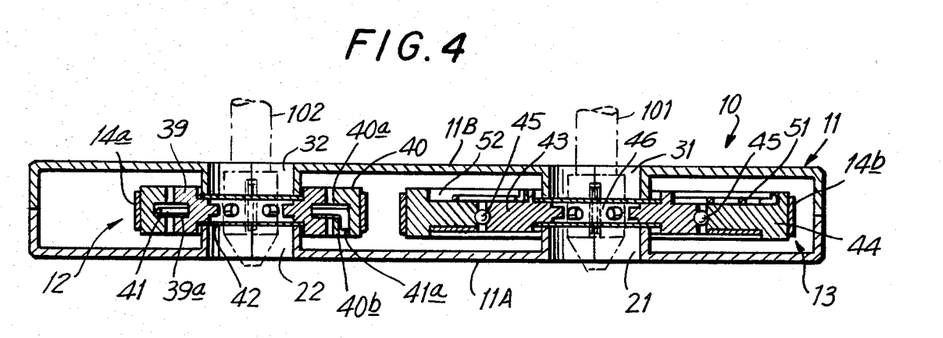
FIG. 4 is an enlarged sectional view taken along the line IV—IV on FIG. 3.

The tape-tension measuring device 10 intended to be interchangeable with a tape cassette in the apparatus 100 is shown to comprise a casing 11 substantially equivalent to the cassette housing to be interchanged therewith and which, as shown particularly on FIG. 1, includes substantially rectangular, mating upper and lower sections 11A and 11B, respectively, preferably molded of a transparent synthetic resin, such as, polystyrene. The device 10 is further shown to comprise first and second reel assemblies 12 and 13 generally corresponding to the take-up and supply reels of the tape cassette with which device 10 is to be interchangeable, and a test tape 14 which has only about three or four turns thereof wound on the outer peripheries of reel assemblies 12 and 13, as at 14a and 14b (FIG. 4), and an intermediate tape run 14a extending between the wound portions 14a and 14b of the test tape.

As shown particularly on FIG. 1, in the lower casing section 11B, guide pins 15 and 16 and adjacent guide rollers 17 and 18, respectively, are arranged adjacent the corners thereof which are at the opposite ends of one long side $S_1$ of the rectangular casing section. A pair of laterally spaced openings 19 and 20 are symmetrically provided in the bottom wall of casing section 11B adjacent side $S_1$ for selectively receiving capstan 103. A pair of flanged spaced apart apertures 21 and 22 are also formed in the bottom wall of casing section 11B and are located to receive reel shafts 101 and 102. The peripheral wall or flange of casing section 11B is formed, along the side $S_1$ thereof, with a pair of spaced apart cutouts 23 and 24 adjacent openings 19 and 20, and with a cutout 25 substantially centered between cutouts 23 and 24. A magnetic shielding plate 26 is arranged behind the peripheral wall or flange of casing section 11B along the middle portion of side $S_1$ thereof, and a leaf spring 27 carrying a tape back-up pad 28, for example, of felt, is suitably secured to the magnetic shielding plate 26. Similarly, the top wall of upper casing section 11A has a pair of openings 29 and 30 located for alignment with opening 19 and 20 and a pair of flanged apertures 31 and 32 located similarly to the apertures 21 and 22. The peripheral wall or flange of upper casing section 11A has cutouts 33, 34 and 35 spaced apart along the side $S_1$ similarly to the cutouts 23, 24 and 25.

After reel assemblies 12 and 13 and the associated test tape 14 have been installed in lower casing section 11B, upper casing section 11A is mated with lower section 11B and the two sections are secured to each other by screws 36 which are threaded through holes 37 in section 11A into tapped bosses 38 in section 11B. When sections 11A and 11B are thus secured together in mating relation to form casing 11, cutouts 33, 34 and 35 are aligned with cutouts 23, 24 and 25, respectively, to define respective openings spaced apart along side S of casing 11, and openings 29 and 30 are aligned with openings 19 and 20, respectively.

In the illustrated embodiment of the invention, the first reel assembly 12 which corresponds to the take-up reel of a tape cassette is shown to include an inner ring portion 39 and a concentric outer ring portion 40 which encircles the inner portion 39 and is spaced radially from the latter so as to be rotatable in respect thereto. A loop spring 41 of polygonal, for example, square, configuration provides a slippable friction clutch between ring portions 39 and 40. More particularly, as shown on FIGS. 2 and 4, the outer and inner circumferential surfaces of ring portions 39 and 40 are formed with angular grooves 39a and 40a, respectively, and the substantially square loop spring 41 is shaped and dimensioned so that its substantially straight sides will be received in annular groove 39a and elastically engage against the bottom of such groove, while the corners of square loop spring 41 extend into annular groove 40a and elastically contact the bottom of the latter groove. Further, if desired, square loop spring 41 may be bent from a length of spring wire in which case, as shown, the ends of such length of wire are bent together substantially normal to the plane of the square loop, as at 41a, and anchored in a hole 40b opening from the groove 40a in outer ring portion 40 so as to lock spring 41 relative to the outer ring portion. The inner ring portion 39 of reel assembly 12 is further shown to define a hub 42 adapted to receive the take-up reel shaft 102 of apparatus 100, and by which inner ring portion 39 is rotatably coupled with shaft 102.

The second reel assembly 13 is shown to comprise an inner ring portion 43 and a concentric outer ring portion 44 encircling inner ring portion 43 and being mounted for turning relative to the latter, for example, by means of ball bearings 45 received in races formed in the confronting circumferential surfaces of ring portions 43 and 44. Inner ring portion 43 has a hub 46 for receiving supply reel shaft 101, and is fixed relative to casing 11, for example, by pins 47 (FIG. 1) seated in holes 48 and 49 in upper and lower casing sections 11A and 11B and extending through holes 50 in inner ring portion 43. A spiral ring 51 (FIG. 2) is accommodated in an annular recess 52 formed in the underside of reel assembly 13 and the opposite ends of spring 51 are bent and respectively anchored in sockets 51a and 51b formed in the inner and outer ring portions 43 and 44. Thus, when the tape 14 is driven in the direction of the arrow A on FIG. 2 for unwinding the tape from the outer peripheral surface of outer ring portion 44, the consequent turning of the outer ring portion 44 relative to the fixed inner ring portion 43 is yieldably resisted by spring 51 with a progressively increasing force in the direction of the arrow B.

As shown on FIGS. 1 and 3, a dial or scale 53 for the measurement of tape tension, for example, in the range of 0 to 200 grams, in printed or inscribed on the upper surface of outer ring portion 44, and an index 54 is pointed or inscribed on the upper surface of inner ring portion 43. Thus, by the cooperative action of scale 53 and index 54, the tape tension is indicated as a function of the angle of turning of outer ring portion 44 relative to inner ring portion 43.

Figure 2:
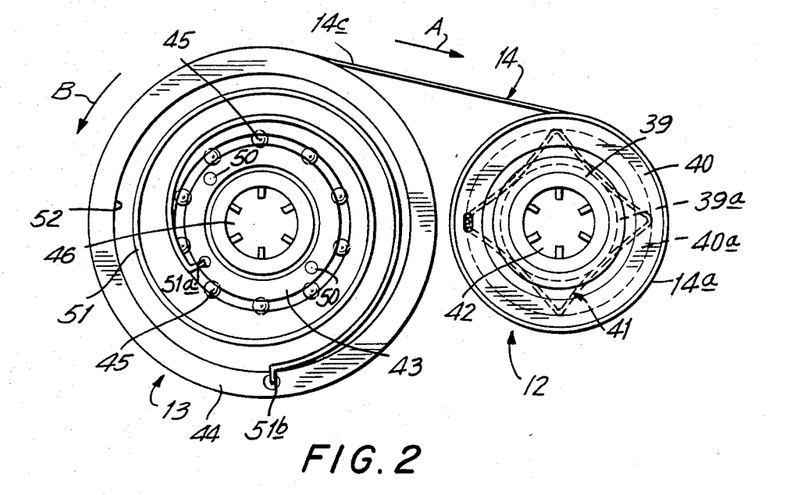
FIG. 2 is a bottom plan view of reel assemblies and a connecting test tape which are included in the device of FIG. 1.

As is shown particularly on FIGS. 1–3, in the tape-tension measuring device 10, tape 14 is wound in opposite directions on reel assemblies 12 and 13 and, with the latter assembled within casing 11, as on FIG. 3, the intermediate tape run 14c is directed from a location on the periphery of reel assembly 13 remote from reel assembly 12 to guide pin 15 and guide roller 17 and then along substantially the entire length of side $S_1$ to guide roller 18 and guide pin 16 prior to returning to the periphery of reel assembly 12 at a location on the latter remote from reel assembly 13.

When tape-tension measuring device 10 is installed in the recording and/or reproducing apparatus 100 in place of a conventional tape cassette, supply reel shaft 101 extends though aligned apertures 21 and 31 and is received in hub 46 of reel assembly 13, take-up reel shaft 102 similarly extends through aligned apertures 22 and 32 and is received in hub 42 of reel assembly 12, and capstan 103 extends through aligned openings 20 and 30 of casing 11. Further, in the recording and reproducing mode of apparatus 100, pinch roller 104 is pressed into the opening formed by cutouts 24 and 34 to press test tape run 14c against capstan 103 and magnetic recording and reproducing head 105 is moved through the opening formed by cutouts 25 and 35 to engage the test tape against pad 28. In the recording mode of operation of apparatus 100, erasing head 106 also enters the opening formed by cutouts 23 and 33 to engage the test tape exposed at such opening. As is shown on FIG. 3, the pinch roller 104 may be advantageously rotatably supported at one end of a support lever 107 which, adjacent its opposite end, is pivoted on a pivot pin 108 extending from a chassis 109 of apparatus 100. A torsion spring 110 is mounted on a pin 111 extending from chassis 109, and such torsion spring 110 has arms 110a and 110b which respectively engage against an anchor 112 on chassis 109 and a projection 107a on support lever 107. Spring 110 urges lever 107 to pivot in the clockwise direction, as viewed on FIG. 3, about pivot pin 108, and thereby urges pinch roller 104 against capstan 103 with the tape 14 therebetween.

The tape-tension measuring device 10, insofar as the same has been described, operates as follows:

With device 10 situated or installed on apparatus 100, as described above, capstan 103 is rotated in response to operation of a suitable electric motor (not shown) of apparatus 100. In response to selection of the reproducing or recording mode of operation of apparatus 100, pinch roller 104 is urged against capstan 103 with tape run 14c therebetween so that the tape is drawn or transported by capstan 103 in the direction of the arrow C on FIG. 3, and take-up reel shaft 102 is rotated in the direction for winding the tape on reel assembly 12. Since hub 42 provides a rotatable coupling of inner ring portion 39 with rotated take-up reel shaft 102, inner ring portion 39 of reel assembly 12 is rotated in the direction of the arrow D on FIG. 3 and the slippable friction clutch constituted by loop spring 41 serves, at least initially, to rotate outer ring portion 40 with inner ring portion 39 for winding or taking up the test tape 14 on reel assembly 12 as tape run 14c is advanced by the cooperative action of capstan 103 and pinch roller 104. In response to the drawing or transporting of the tape run 14c by capstan 103 and pinch roller 104, the test tape is unwound from the outer peripheral surface of reel assembly 13 thereby causing turning of outer ring portion 44 in the direction of the arrow E relative to the inner ring portion 43. Such relative turning is resisted by spiral spring 51 with a progressively increasing spring force. In other words, outer ring portion 44 of reel assembly 13 turns relative to inner ring portion 43 until the tape tension in tape run 14c between the nip of capstan 103 with pinch roller 104 and reel assembly 13 is balanced by the progressively increasing force of spring 51 resisting any further relative turning of ring portions 43 and 44. After such balance is achieved, capstan 103 slips relative to test tape 14 so that movement of tape run 14c is interrupted and the position of index 54 on scale or dial 53 then indicates the maximum tape tension that is generated by apparatus 100 with a particular pressure of pinch roller 104 against capstan 103. When the force of spring 51 causes rotated capstan 103 to slip relative to the tape being pressed thereagainst by pinch roller 104, and thereby arrests further movement of tape run 14c from reel assembly 13 to reel assembly 12, the turning of outer ring portion 40 of reel assembly 12 is also halted and the slippable friction clutch constituted by wire 41 slips in groove 39a to permit the continued rotation of inner ring portion 39 with take-up reel shaft 102.

In some magnetic tape recording and/or reproducing apparatus, there is provided an automatic shut-off mechanism which, in the recording or reproducing mode of operation, detects the end of the tape by sensing a halt in the rotation of the take-up reel shaft, whereupon the apparatus is automatically changed-over to its stop mode. It will be apparent that, when the tape-tension measuring device 10 is applied to a recording and/or reproducing apparatus with such automatic shut-off mechanism, false operation of the latter is avoided in response to the presence of device 10 in that take-up reel shaft 102 can continue to rotate as slippage occurs between loop spring 41 and annular groove 39a of inner ring portion 39. The slippable friction clutch constituted by loop spring 41 is further advantageous in that it ensures that the maximum tension that can be applied to tape 14 during use of device 10 is limited by the force with which pinch roller 104 is urged against capstan 103.

If desired, the recording and/or reproducing apparatus 100 with which tape-tension measuring device 10 is intended to be used may be arranged so that, during operation of device 10 for measuring the tape tension, the tape tension can be adjusted, for example, by varying the pressure with which spring 110 urges pinch roller 104 against capstan 103. Thus, for example, pivot pin 108 may be adjustable in the direction of the arrow F on FIG. 3 for decreasing the moment arm of the force of spring 110 on lever 107 and thereby decreasing the force of pinch roller 104 against capstan 103 for correspondingly reducing the tape tension. On the other hand, the abutment or anchor pin 112 for arm 110a of spring 110 may be made adjustable on chassis 109 in the direction of the arrow G, whereby to increase the spring force acting on lever 107 for correspondingly increasing the tape tension. In order to vary the force exerted by spring 110 on lever 107 for adjusting the tape tension, the pin 112 shown on FIG. 3 may be replaced by a series of spaced apart perforations formed in chassis 109 along an arc concentric with pin 111, and arm 110a of spring 110 can then be formed with a downwardly bent end which is positioned in a selected one of the perforations for providing the desired spring force.

Figure 5:
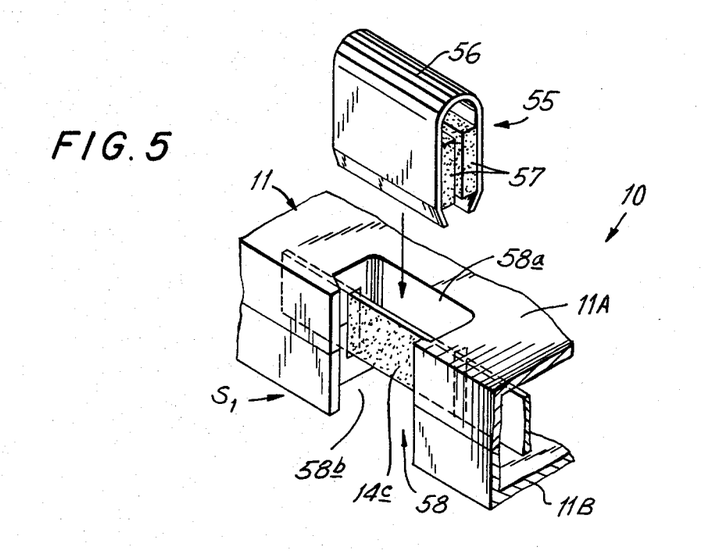
FIG. 5 is an enlarged perspective view of a tape-cleaning member shown preparatory to being assembled in the casing of the tape-tension measuring device of FIGS. 1 and 3.
Figure 6:
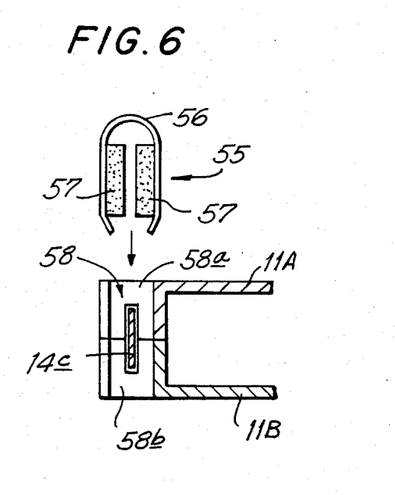
FIGS. 6 and 7 are detail sectional views showing the tape-cleaning member before and after installation in a respective recess of the casing.

It will be apparent that, when adjusting the pressure of pinch roller 104 against capstan 103 for obtaining a desired tape tension as indicated by index 54 on scale 53, the desired tape tension can actually be obtained only if it is assumed that a standard or uniform coefficient of friction is realized at the engagement of pinch roller 104 and capstan 103 with tape 14. However, oily or other contaminating substances may accumulate on tape 14, particularly at run 14c thereof, with the result that the actual coefficient of friction at the engagement of capstan 103 and pinch roller 104 with the test tape is substantially different from the assumed value. Therefore, in accordance with the present invention, the tape-tension measuring device 10 is provided with tape-cleaning means 55 mounted at the side $S_1$ of casing 11 and engaging the test tape run 14c at a location along the path of the latter between second reel assembly 13 and the openings provided in casing 11 for capstan 103 and pinch roller 104. As is shown on FIGS. 5 and 6, the tape-cleaning means 55 may be simply constituted by a generally U-shaped support member 56, for example, of synthetic resin or metal, and a pair of cleaning pads 57, for example, of felt, attached to the confronting surfaces of U-shaped support member 56 and being slightly spaced from each other for accommodating the test tape run 14c therebetween with pads 57 pressing softly against the opposed surfaces of the tape.

Figure 7:
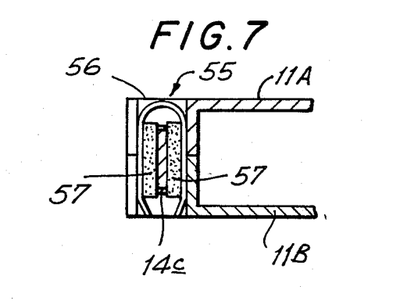

In a convenient arrangement for mounting tape-cleaning means 55, the upper and lower casing sections 11A and 11B have aligned recesses 58a and 58b between cutouts 34 and 35 and cutouts 24 and 25, respectively. Thus, when casing sections 11A and 11B are assembled together, recesses 58a and 58b are aligned to constitute a single recess 58 opening at the top and bottom of casing 11 and also having a restricted opening at the side $S_1$. Such recess 58 is dimensioned so that U-shaped support member 56 is slightly compressed when inserted into the recess from above, as indicated on FIGS. 5 and 6, and thus is frictionally retained in its operative position within recess 58, as shown in FIG. 7.

It will be apparent that whenever device 10 is removed from a recording and/or reproducing apparatus 100, spiral spring 51 is effective to turn outer ring portion 44 of reel assembly 13 in the clockwise direction, as viewed on FIG. 3, that is, in the direction to rewind the test tape on reel assembly 13. During such rewinding of the tape on reel assembly 13, test tape run 14c is drawn backward through tape-cleaning means 55 so that pads 57 of the latter clean any contaminating substances from the engaged surfaces of the tape. Thereafter, when device 10 is installed on an apparatus 100 for measuring the tape tension generated in the latter, the selection of the reproducing or recording mode of apparatus 100 again causes capstan 103 and pinch roller 104 to cooperate in drawing or transporting the test tape in the direction of the arrow C on FIG. 3 so that the tape 14 is cleaned by cleaning means 55 before it reaches the capstan 103 and pinch roller 104 to be driven therebetween. Accordingly, the tape is in clean condition when engaged by the capstan and pinch roller to ensure that the tape tension indicated by index 54 on scale 53 at the time when capstan 103 slips relative to the tape is a true indication of the maximum tape tension for a coefficient of friction of the tape relative to the capstan which corresponds to the clean condition of the tape. Therefore, inaccuracies will not occur due to oily substances or other contaminants on the tape 14 when using device 10 for adjusting the tape tension by varying the force of spring 110.

If the outer diameter of reel assembly 13 is d and its outer ring portion 44 turns through an angle $\theta$ relative to inner ring portion 43 in order for the force of spring 51 to become sufficient to balance the tape tension produced by the engagement of capstan 103 and pinch roller 104 with test tape 14, then the length l of the tape 14 which unwinds from reel assembly 13 in the course of the relative turning of outer ring portion 44 through the angle $\theta$ is determined by the following equation:

$$l = \pi d \times (\theta/360) \tag{1}$$

In accordance with the present invention, the tape cleaning means 55 is preferably disposed along side $S_1$ of casing 11 so that the distance $l_1$ from tape cleaning means 55 to the nip between capstan 103 and pinch roller 104 is smaller than the length l determined by equation (1) above.

Generally, the tape tension to be measured is within a certain range, and the length l is calculated from equation (1) for the condition where the angle $\theta$ corresponds to the largest tape tension within such range. It will be apparent that, so long as the distance $l_1$ is smaller than the length l, each use of device 11 for measuring the tape tension will be accompanied by the wiping clean of at least the length of the tape 14 which is drawn between capstan 103 and roller 104 in the course of the relative turning of outer ring portion 44 in respect to inner ring portion 43 for indicating the tape tension on scale 53.

Figure 8:
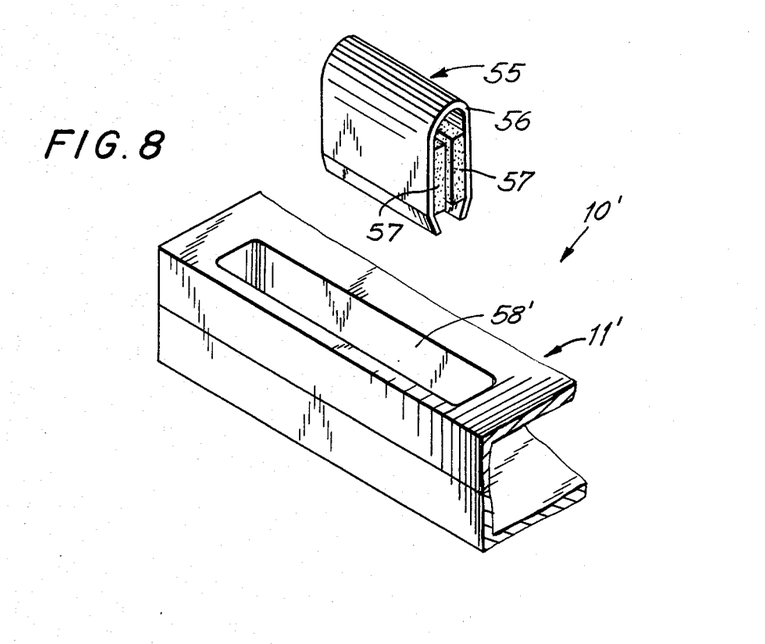
FIG. 8 is a view similar to that of FIG. 5, but illustrating another embodiment of the invention in which the tape-cleaning member can be adjustably positioned along the run of the test tape to be engaged thereby.
Figure 9:
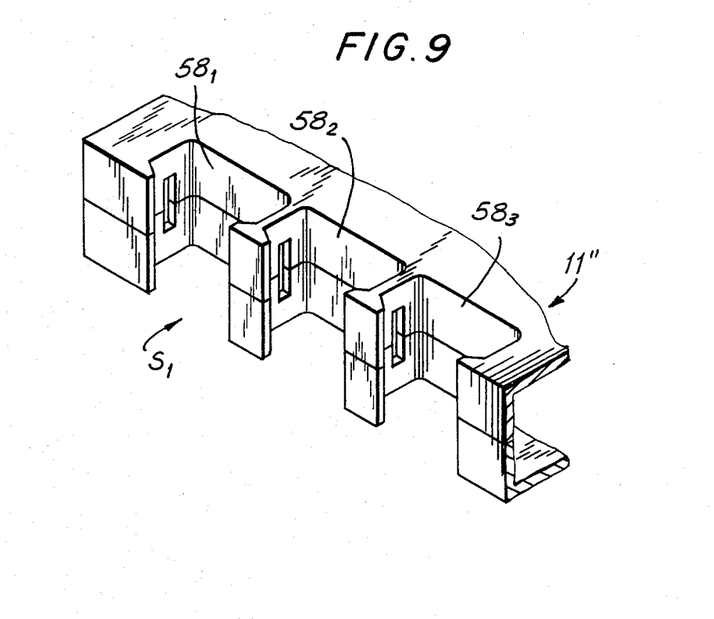
FIG. 9 is a perspective view of a fragment of the casing of a tape-tension measuring device according to still another embodiment of this invention, and which also permits adjustable positioning of the tape-cleaning member.

In the case where the tape-tension measuring device according to this invention is intended to be used in connection with recording and/or reproducing apparatus that may have a relatively large range of tape tensions, the tape cleaning means 55 is desireably made adjustable so as to correspondingly change the distance from the tape cleaning means to the nip of the capstan and pinch roller. Thus, for example, as shown on FIG. 8, in a tape-tension measuring device 10' according to another embodiment of this invention, the casing 11' is provided with a recess 58' having a length substantially greater than the length of the support member 56 of tape cleaning means 55 so that the latter can be adjustably moved along recess 58'. In another embodiment illustrated on FIG. 9, the casing 11' of a tape-tension measuring device according to this invention is shown to have a plurality of recesses $58_1$, $58_2$ and $58_3$ arranged successively along the side $S_1$ of the casing 11" so that the tape cleaning means 55 (not shown on FIG. 9) may be selectively disposed in any one of the recesses $58_1$–$58_3$ so as to be at a corresponding distance from the nip of the capstan and pinch roller. It will be appreciated that the tape-tension measuring devices according to the embodiments of this invention illustrated by FIGS. 8 and 9 may be otherwise similar to the device 10 previously described in detail with reference to FIGS. 1–7.

Figure 10:
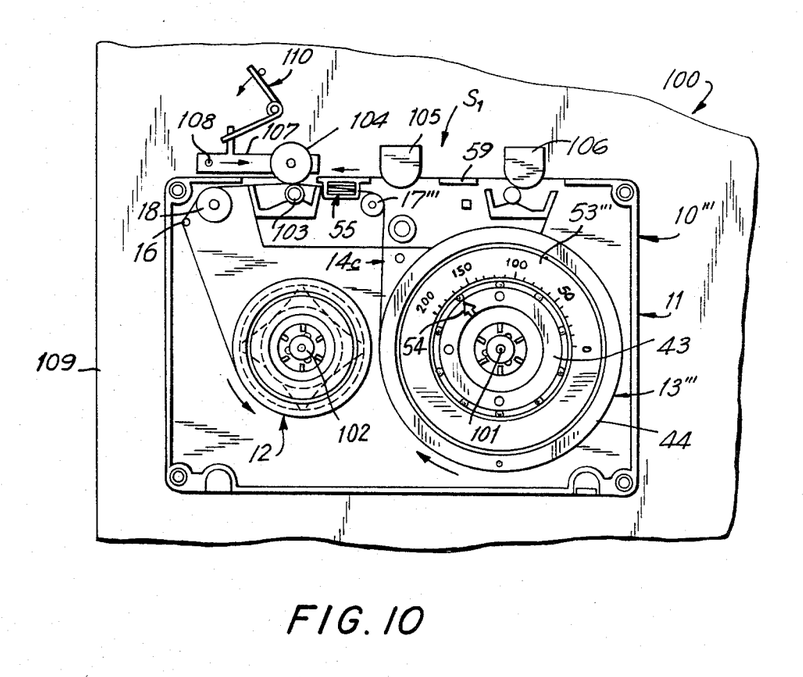
FIG. 10 is a view similar to that of FIG. 3, but showing still another embodiment of the invention.

Referring now to FIG. 10, it will be seen that a tape-tension measuring device 10''' according to still another embodiment of this invention is shown associated with a recording and/or reproducing apparatus 100, as on FIG. 3, and has its several elements corresponding to those described with reference to device 10 identified by the same reference numerals. The device 10''' is substantially distinguished from the previously described device 10 in that the reel assembly 13''' has the tape 14 wound thereon in the same direction as the tape wound on the other reel assembly 12. Thus, the tape wound on the outer periphery of reel assembly 13''' leaves the latter at the side thereof facing toward reel assembly 12 and is directed toward side $S_1$ of casing 11 at a location near to tape cleaning means 55. At such location, tape run 14c engages a guide roller 17''' which is provided in place of the guide pin 15 and guide roller 17 in the first described device 10. Further, in the device 10''', the direction of the scale 53''' on outer ring portion 44 of reel assembly 13''' is opposite to that of the scale 53 on reel assembly 13. Further, the spiral spring (not shown) associated with reel assembly 13''' and corresponding to the previously described spiral spring 51 is effective to yieldably resist, with a progressively increasing spring force, turning of the outer ring portion 44 of reel assembly 13''' in the clockwise direction relative to the respective inner ring portion 43 which is fixed to casing 11.

It will be apparent that, in the tape-tension measuring device 10''' illustrated on FIG. 10, the tape run 14c of the test tape extending between reel assemblies 12 and 13''' is guided in a path which extends along only a portion of the side $S_1$ of the casing 11 at which the openings for capstan 103 and pinch roller 104 are located so that the additional operating members, such as, the recording and reproducing head 105 and the erasing head 106, remain free of the test tape 14 during the testing of the tape tension with the apparatus 100 in either its reproducing or recording mode.

It will be appreciated that the device 10''' operates substantially in the same manner as the previously described device 10 for measuring the tape tension resulting from the engagement of the rotated capstan 103 with the test tape while the latter is pressed against the capstan by pinch roller 104. Of course, in the case of the device 10''', during the measuring of tape tension, the driving of tape run 14c by the cooperative action of capstan 103 and pinch roller 104 causes turning of outer ring portion 44 relative to inner ring portion 43 in the clockwise direction, rather than in the counter-clockwise direction as in the case of the device 10, until such time as the spring force resisting such relative turning becomes sufficiently large to cause slipping of capstan 103 relative to the test tape, whereupon, the maximum tape tension is indicated by index 54 on scale 53'''. The device 10''', as before, may be desireably provided with the tape cleaning means 55 for ensuring that the frictional contact of capstan 103 and pinch roller 104 with the test tape will not be adversely influenced or varied by oily substances or other contaminants on the test tape.

The tape-tension measuring device 10''' according to this invention is particularly desireable in that, during the operation thereof for measuring tape-tension, the heads 105 and 106 do not contact the test tape and, therefore, the frictional forces that would result from contact of heads 105 and 106 with the test tape, as in the device 10, cannot influence the measured tape-tension as indicated by index 54 on scale 53'''. In other words, in device 10''', the angle of turning of outer ring portion 44 relative to inner ring portion 43 against the progressively increasing spring force more accurately represents the tape tension produced by the engagement of rotated capstan 103 with the test tape under the pressure of pinch roller 104.

The device 10''' is further desireable for use in connection with a recording and/or reproducing apparatus of the type having an automatic shut-off mechanism with an actuating lever (not shown) which is, for example, inserted into an opening 59 provided in the peripheral wall of casing 11 between the openings for heads 105 and 106. If the device 10 of FIGS. 1–7 was used in a recording and/or reproducing apparatus with such an automatic shut-off mechanism, the actuating lever extending through opening 59 would engage tape run 14c and respond to the tension in such tape run when capstan 103 is made to slip relative to the test tape so as to effect change-over of the apparatus to its stop mode. Thus, the tape tension could not be measured. However, in the case of the device 10''', the path in which tape run 14c is guided between reel assembly 13''' and reel assembly 12 is remote from opening 59 so that, in the event that an actuating lever of an automatic shut-off mechanism extends through opening 59, such actuating lever cannot be influenced by the tape tension and the latter can be accurately masured without interference from the automatic shut-off mechanism.

Although the various tape-tension measuring devices shown on the drawings are dimensioned and shaped so as to be interchangeable with so-called "compact" or "Phillips-type" cassettes for measuring tape tension in apparatus intended for use with such cassettes, it will be appreciated that the invention can also be applied to the measurement of tape tension in any other type of magnetic tape recording and/or reproducing apparatus, such as, a cassette-type VTR.

Having described various specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape-tension measuring device interchangeable with a tape cassette in a cassette-type magnetic tape recording and/or reproducing apparatus which has selectively rotated supply and take-up reel shafts adapted to extend through respective apertures of a cassette housing for engagement with tape supply and take-up reels within the latter, and a tape drive capstan and pinch roller and additional operating members adapted to extend through respective openings of the cassette housing for engagement with a tape in the latter at spaced apart locations along one side of the cassette housing during recording and reproducing operations of the apparatus: said tape-tension measuring device comprising a casing substantially equivalent to the cassette housing to be interchanged therewith and having openings at locations along one side of the casing in correspondence to said openings of the cassette housing; first and second reel assemblies in said casing, means in said first reel assembly for rotatably coupling the latter with the take-up reel shaft, said second reel assembly including an inner ring portion fixed relative to said casing and having a hub for receiving the supply reel shaft, an outer ring portion rotatable relative to said inner ring portion and spring means yieldably resisting turning of said outer ring portion relative to said inner ring portion; a test tape having portions wound on said first reel assembly and said outer ring portion of the second reel assembly and an intermediate tape run therebetween for causing said outer ring portion to turn relative to said inner ring portion through an angle dependent on the tension in said tape run; means for indicating tape tension as a function of said angle of relative turning; and guide means guiding said tape run along a path which extends along only a portion of said one side of the casing at which the openings for the tape drive capstan and pinch roller are located, so that the additional operating members of the recording and/or reproducing apparatus remain free of said test tape in the casing to avoid influencing the tension in said tape run.

2. A tape-tension measuring device according to claim 1; in which said first and second reel assemblies are spaced apart in the direction parallel to said one side of the casing, and said portions of the test tape are wound in the same directions on said first and second reel assemblies with said tape run path having a section between said first and second reel assemblies directed from said outer ring portion of the second reel assembly toward said portion of said one side of the casing.

3. A tape-tension measuring device according to claim 2; in which said portion of said one side is about one-half of the latter and extends from approximately the middle to an end of said one side, and said guide means includes a tape guide roller at said end of said one side to guide the test tape from said one side to said first reel assembly and another tape guide roller adjacent said middle of said one side for guiding the test tape from said section between the reel assemblies.

4. A tape-tension measuring device according to claim 3; in which said additional operating members of the recording and/or reproducing apparatus are a recording and/or reproducing head and an erasing head; and in which said casing has the openings for the recording and/or reproducing head and the erasing head at locations in said one side remote from said one-half.

5. A tape-tension measuring device according to claim 1; further comprising tape cleaning means mounted at said one side of said casing and engaging said test tape in said path between said second reel assembly and said openings for the capstan and pinch roller.

6. A tape-tension measuring device according to claim 5; in which said tape cleaning means includes a U-shaped support member, and a pair of cleaning pads attached to confronting surfaces of said U-shaped support member with said test tape passing between said pads and being softly pressed thereby.

7. A tape-tension measuring device according to claim 6; in which said cleaning pads are of felt.

8. A tape-tension measuring device according to claim 6; in which said casing has a recess in said one side thereof which receives said tape cleaning means.

9. A tape-tension measuring device according to claim 8; in which the length of said recess in the direction along said path is greater than the length of said tape cleaning means in said direction to permit adjustment of the distance along said path between said tape cleaning means and the position at which the test tape is engageable by the capstan and pinch roller.

10. A tape-tension measuring device according to claim 8; in which said casing has at least another recess in said one side spaced from the first-mentioned recess in the direction along said path and also adapted to receive said tape cleaning means so that the latter is selectively disposed in one of said first and other recesses for adjustment of the distance along said path between said tape cleaning means and the position at which the test tape is engageable by the capstan and pinch roller.

11. A tape-tension measuring device according to claim 5; in which said tape cleaning means is disposed so that the distance along said path between said tape cleaning means and the position at which the test tape is engageable by the capstan and pinch roller is smaller than the length of said test tape which is unwound from said outer ring portion of the second reel assembly upon turning of said outer ring portion through said angle dependent on the tape tension.

12. A tape-tension measuring device according to claim 1; in which said first reel assembly includes an inner ring portion and an outer ring portion rotatable relative to the respective inner ring portion; and said means for rotatably coupling the first reel assembly with the take-up reel shaft includes a hub engageable by the take-up reel shaft so as to be nonrotatable relative to the latter, and slippable friction clutch means between said inner and outer ring portions of the first reel assembly operative to transmit only a predetermined rotational force.

13. A tape-tension measuring device according to claim 12; in which said slippable friction clutch means includes an elongated spring of polygonal shape so as to have a plurality of sides and corners therebetween, said spring being disposed with the sides and corners thereof respectively pressed against said inner and outer ring portions of said first reel assembly.

14. A tape-tension measuring device interchangeable with a tape cassette in a cassette-type magnetic tape recording and/or reproducing apparatus which has selectively rotated supply and take-up reel shafts adapted to extend through respective apertures of a cassette housing for engagement with tape supply and take-up reels within the latter, and a tape drive capstan and pinch roller adapted to extend through respective openings of the cassette housing for engagement with a tape in the latter at a location adjacent one side of the cassette housing during recording and reproducing operations of the apparatus: said tape-tension measuring device comprising a casing substantially equivalent to the cassette housing to be interchanged therewith and having openings at locations along one side of the casing in correspondence to said openings of the cassette housing; first and second reel assemblies in said casing, means in said first reel assembly for rotatably coupling the latter with the take-up reel shaft, said second reel assembly including an inner ring portion fixed relative to said casing and having a hub for receiving the supply reel shaft, an outer ring portion rotatable relative to said inner ring portion and spring means yieldably resisting turning of said outer ring portion relative to said inner ring portion; a test tape having portions wound on said first reel assembly and said outer ring portion of the second reel assembly and an intermediate tape run therebetween for causing said outer ring portion to turn relative to said inner ring portion through an angle dependent on the tension in said tape run; means for indicating tape tension as a function of said angle of relative turning; guide means guiding said tape run along a path which extends along at least the portion of said one side of the casing at which the openings for the tape drive capstan and pinch roller are located; and tape cleaning means mounted at said one side of said casing and engaging said test tape in said path between said second reel assembly and said openings for the capstan and pinch roller.

15. A tape-tension measuring device according to claim 14; in which said tape cleaning means includes a U-shaped support member, and a pair of cleaning pads attached to confronting surfaces of said U-shaped support member with said test tape passing between said pads and being softly pressed thereby.

16. A tape-tension measuring device according to claim 15; in which said cleaning pads are of felt.

17. A tape-tension measuring device according to claim 14; in which said casing has a recess in said one side thereof which receives said tape cleaning means.

18. A tape-tension measuring device according to claim 17; in which the length of said recess in the direction along said path is greater than the length of said tape cleaning means in said direction to permit adjustment of the distance along said path between said tape cleaning means and the position at which the test tape is engageable by the capstan and pinch roller.

19. A tape-tension measuring device according to claim 17; in which said casing has at least another recess in said one side spaced from the first-mentioned recess in the direction along said path and also adapted to receive said tape cleaning means so that the latter is selectively disposed in one of said first and other recesses for adjustment of the distance along said path between said tape cleaning means and the position at which the test tape is engageable by the capstan and pinch roller.

20. A tape-tension measuring device according to claim 14; in which said tape cleaning means is disposed so that the distance along said path between said tape cleaning means and the position at which the test tape is engageable by the capstan and pinch roller is smaller than the length of said test tape which is unwound from said outer ring portion of the second reel assembly upon turning of said outer ring portion through said angle dependent on the tape tension.

21. A tape-tension measuring device according to claim 14; in which said first reel assembly includes an inner ring portion and an outer ring portion rotatable relative to the respective inner ring portion; and said means for rotatably coupling the first reel assembly with the take-up reel shaft includes a hub engageable by the take-up reel shaft so as to be nonrotatable relative to the latter, and slippable friction clutch means between said inner and outer ring portions of the first reel assembly operative to transmit only a predetermined rotational force.

22. A tape-tension measuring device according to claim 21; in which said slippable friction clutch means includes an elongated spring of polygonal shape so as to have a plurality of sides and corners therebetween, said spring being disposed with the sides and corners thereof respectively pressed against said inner and outer ring portions of said first reel assembly.

* * * * *